United States Patent [19]

Stockwell

[11] 4,030,218

[45] June 21, 1977

[54] SEGMENTED MAP AND HOLDER

[75] Inventor: Guy N. Stockwell, Springfield, Va.

[73] Assignee: The United States of America as represented by the Secretary of the Army, Washington, D.C.

[22] Filed: Sept. 7, 1976

[21] Appl. No.: 720,713

[52] U.S. Cl. .................................. 40/102; 35/42; 283/34

[51] Int. Cl.² ..................................... G09B 29/02

[58] Field of Search .................. 40/102, 104.03, 104.11-104.14, 40/104.17-104.19, 10 R; 35/40, 42; 283/34, 35

[56] References Cited

UNITED STATES PATENTS

| 1,697,350 | 1/1929 | Eubank | 40/102 X |
| 2,103,139 | 12/1937 | Bergquist | 283/35 |
| 2,291,683 | 8/1942 | Boothe | 35/40 |
| 2,294,276 | 8/1942 | Callinicos | 283/34 X |
| 2,693,648 | 11/1954 | Anderson | 35/42 |

FOREIGN PATENTS OR APPLICATIONS

| 471,241 | 7/1914 | France | 40/102 |
| 1,379,655 | 1/1975 | United Kingdom | 283/34 |

Primary Examiner—John F. Pitrelli
Attorney, Agent, or Firm—Thomas O. Maser; John G. Mannix

[57] ABSTRACT

A map is segmented into columns and rows, and pairs of segments are laminated back to back in a particular manner: the segments of each column serially, and the columns serially. A marginal flap is provided at the top of each segment, wider than the segment and with a slot in it as well as the segment. A ring passes through the slots to hold the segments together, and to permit the viewing of two segments which are adjacent in the map.

9 Claims, 7 Drawing Figures

SEGMENTED MAP AND HOLDER

BACKGROUND OF THE INVENTION

The present invention relates to maps, and more particularly to a segmented map and a holder therefor.

Maps are typically printed on sheets of paper or other suitable material, the printed sheet being of a limited size, permitting it to be held by a person with both hands when fully extended, or placed on a suitable table. It is recognized, of course, that many maps present relatively large areas, only a portion of which are of interest at a particular time. Also, it has been recognized that it not being necessary to view the entire map at a a particular time, the map could be folded so as to be of a handier size, while exposing that portion which is of interest. In addition, there have been proposed the dividing or segmenting of maps so that a single sheet at a time could be viewed.

For example, in one known proposal, the map of an area was printed on one side of a sheet, and then the map of essentially the same area was printed on the rear of the sheet, but offset horizontally and vertically. The thus printed map was divided into columns and rows on one surface, and segmented by the columns and rows. There were then provided from the segmented maps a plurality of individual sheets or segments, each having a portion of the original map on one surface, and on the back surface a portion of the same map, but somewhat offset. In that way, if an area of interest occurred at the junction of four of these map segment sheets on the front, the intersecting corner of these four portions was located in the approximate middle of a map segment on the rear surface, and thereby transition across boundries of a segment was facilitated by reversal of the segment.

In another proposal, a map was divided into rows and columns, thereby providing a plurality of segments. These segments were then individually mounted on a backing sheet provided with holes at the corners thereof. A person desiring to plan a trip between two cities could then assemble in sequence the map segments which carried the desired route from one city to another, and by viewing the map segments in the serial order selected, could trace his route between the two cities. In this proposal, the mounted map segments were placed in a ring binder, the rings passing through the holes in the mounting sheet.

In still another prior art proposal, a road map was arranged in strip form, and accordion folded, so that there were provided map segments and two segments could be viewed at the same time by unfolding the accordion-folded strip map.

These known proposals have generally been deficient in not providing a map which could be handily carried about, and which provided for juxtaposition in a suitable manner of adjacent map segments, either in rows or columns, while providing a suitble holding arrangement to keep segments of the map from becoming separated and lost. Further, there has been no provision in the prior art for ready determination of which segments are to be viewed, in a segmented map arrangement.

SUMMARY OF THE INVENTION

A map is provided comprising a plurality of map segments of approximately the same size. The map segments are of a map that has been divided into horizontal rows and vertical columns, and two map segments thus obtained are laminated back to back, to provide a sheet. More particularly, the first segment at the top of one column is laminated to the second segment of that column, and this pattern is repeated for the entire column, and then the segments of the other columns are laminated in like manner.

Each of the two-segment sheets is provided at the top with a marginal flap that is wider than the sheet and which has a slot as wide as the sheet. A suitable holding devide, such as a ring, extends through the slots of the second flaps. The map may be conveniently carried with the sheets stacked and held by the holding device, and then manipulated to place together two adjacent segments of a column, or two adjacent segments in a row.

An object of the present invention is to provide a map which is segmented, for convenience in carrying. Another object of the present invention is the provision of a segmented map, capable of having adjacent segments in both rows and columns of the original map placed in adjacent juxtaposition. Still another object of the present invention is the provision of a segmented map in which, except for certain segments, two segments may be placed in adjacent relationship either to vertically adjacent segments or to horizontally adjacent segments, from columns and rows, respectively. Still another object of the present invention is the provision of a segmented map having provision for ready determination of the segments which are to be viewed together, when an area of interest has been determined.

Other objects and many of the attendant advantages of the present invention will be more readily understood from the following specification, claims and drawings.

DESCRIPTION OF THE PREFERRED EMBODIMENT

Figure 1:
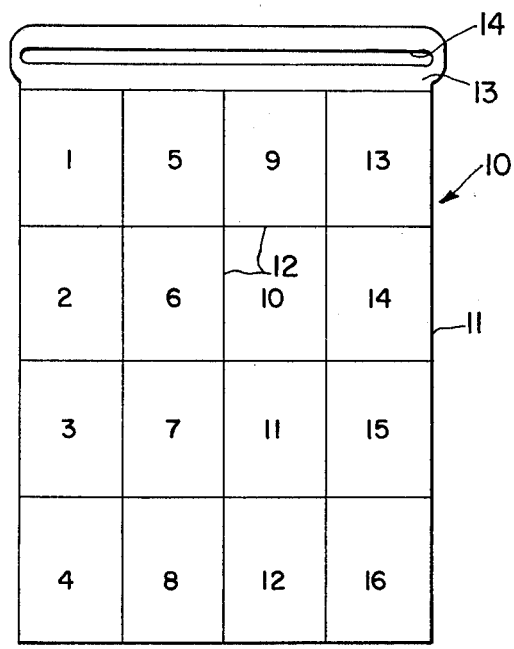
FIG. 1 is a view of a guide sheet forming a part of a segmented map in accordance with the present invention.

Referring now to the drawings, wherein like or corresponding reference numerals are used to designate like or corresponding parts throughout the several views, there is shown in FIG. 1 a guide generally designated 10, and including a sheet of material 11 having a grid 12, comprised of lines which divide the sheet 11 into rows and columns of individual guide segments. Each segment carries a unique indicia thereon, such as a numeral. Thus in the first or left hand row of the guide segments, the upper or top segment is designated 1, the segment below it 2, the next segment is designated 3 and the bottom segment of that row is designated 4. In the next row, the segments are designated, successively, 5–8, and there is serial repetition of rows, with the segments in each row being serially numbered, or otherwise indicated, and with the rows also being serially numbered or otherwise indicated. As a result, each segment has its own individual indicia, and the relative position of all of the segments is thereby clearly indicated on the guide 10.

At its top edge, the guide 10 is provided with a marginal flap 13 which is slightly longer than the width of the sheet 11, and which is provided with a slot 14, the length of which is substantially equal to the width of the sheet 11.

Figure 2:
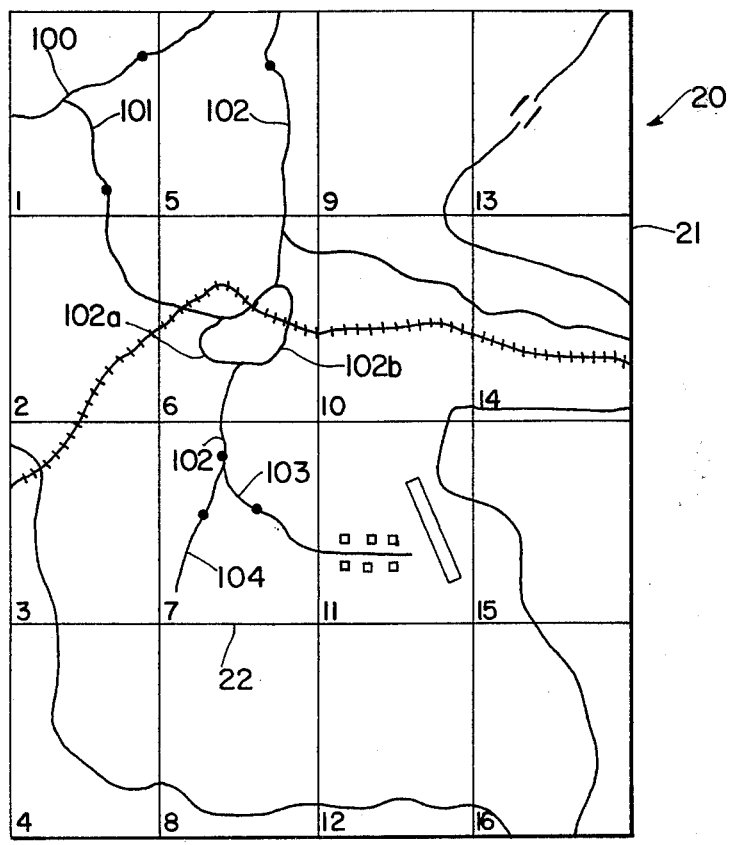
FIG. 2 is a view of a map segmented in accordance with the present invention.

Referring now to FIG. 2, there is shown a map 20, preferably printed on a sheet 21 of paper or other suitable substance. Preferably, after printing on a suitable sheet 21, that sheet is coated on both sides with plastic, so as to provide waterproofing, abrasion protection and stiffness, the plastic being, of course, transparent. The map 20 is divided by a grid 22 into rows and columns, thereby providing map segments. These map segments each carries a unique indicia, corresponding to the indicia on the guide 10. Thus, the upper left hand segment of the map 20 carries a reference indicia 1, as does the upper left hand segment of the guide 10. Thus, the guide 10 and and the map 20 have the same number of rows and columns, and are provided with corresponding indicia. In practice, as will be more fully understood hereinbelow, each of the segments of the map 20 is the same size as the guide 10, without the flap 13 thereon.

In segment 1 of map 20, there will be seen a road 100 extending generally in a northeast-southwest direction, and extending over onto segment 5. The road 100 has extending from it a second road 101, and on the segment 5, in addition to the road 100, there is an additional road 102. The road 102 extends generally north-south and at the lower margin of map segment 5, the road 102 extends onto map segment 6, where it forks into by-pass roads 102a and 102b, then continuing southward, again designated as road 102, onto map segment 7, where it again forks onto an easterly directed branch 103 and a southwesterly branch 104.

The map 20 of FIG. 2 is not only divided by the grid lines into the noted segments, but the segments are severed from each other, to provide thereby, a total of sixteen map segments, each providing a portion of the total large map 20, and each having an indicia thereon, as indicated. Following the dividing of the map 20 into the segments as noted, pairs of segments are laminated together, back-to-back, to provide a map sheet. Alternatively, instead of a laminating process, the provision of a map sheet with two adjacent segments on the back and front thereof could be obtained by suitable front and back printing of a sheet laminating while the preferred method of manufacturing the present invention device, is not the required method.

Each of the sheets, formed of the laminated map segment pairs, is also provided along the edge with a slotted flap substantially identical to the flap 13 shown in FIG. 1. Then the eight sheets obtained are assembled in a particular manner, and held together by a holding device.

Figure 3:
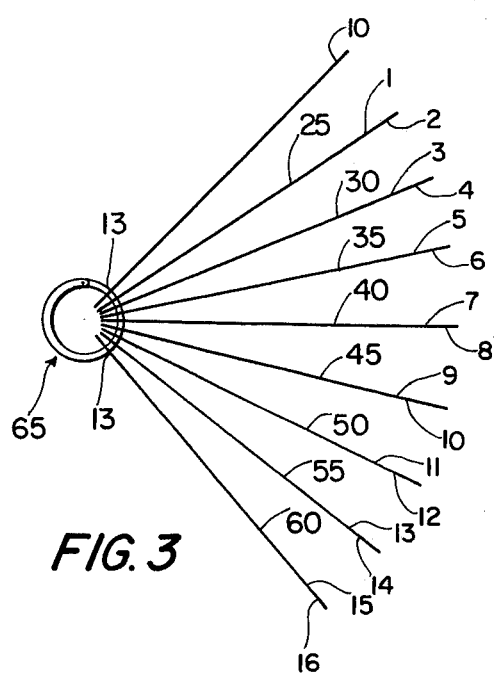
FIG. 3 is a side view of a segmented map and holder in accordance with the present invention.
Figure 4:
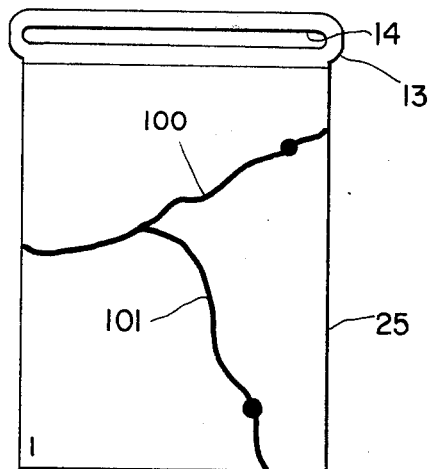
FIG. 4 is a view of the face of a first sheet of the present invention map.

Referring now to FIG. 3, there is shown the sequence of positioning of the segments of the map 20 shown in FIG. 2. There is first provided the guide 10, which serves as a cover. Next there is the sheet 25 having on its upper face the map segment 1 and on its back or lower face the map segment 2. Referring to FIG. 4, there may be seen the face of the sheet 25, containing the map segment 1, and with the slotted flap 13 provided at the upper or north edge of the map segment 1. The sheet 25 has a bottom or southernmost edge 25a on its face, while on its back, there is provided the segment 2, arranged so that the northern boundary or edge is also formed by the edge 25a.

Referring again to FIG. 3, there may be seen in succession the map segment sheets 30, having segment 3 on the upper face and segment 4 on the lower or bottom face thereof, the sheet 35 having the map segments 5 and 6 on the upper and lower faces thereof, and, then serially the sheets 40, 45, 50, 55 and 60, each having the map segments on the front and back thereof as indicated on FIG. 3. Thus, the segments of each column of the map 20 shown in FIG. 2 are laminated back-to-back, in pairs, to provide the eight sheets disclosed in FIG. 3, the segments of each column being arranged serially, and the columns of the map 20 being arranged serially.

A holding device in the form of a ring 65 is provided, extending through all of the slots 14 of all of the flaps 13, including that of the guide or cover 10.

Figure 5:
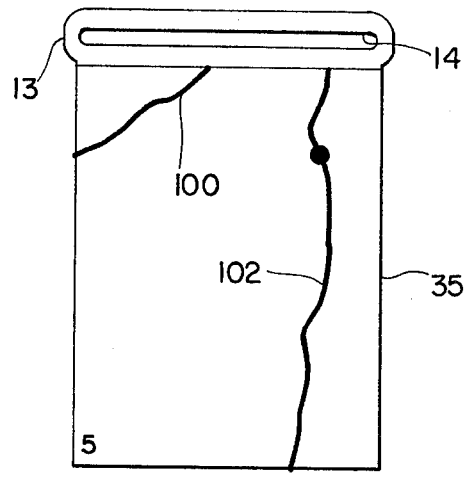
FIG. 5 is a view of the face of another sheet of the map in accordance with the present invention.

Referring again to FIG. 4, reference is had to the upper face of sheet 25, disclosing the map segment 1, including the road 100. FIG. 5 discloses map segment 5, with the easterly portion of the road 100 thereon, as well as the north-south road 102. Segment 5 is the upper face of the sheet 35, which sheet has as a part thereof the slotted flap 13.

Figure 6:
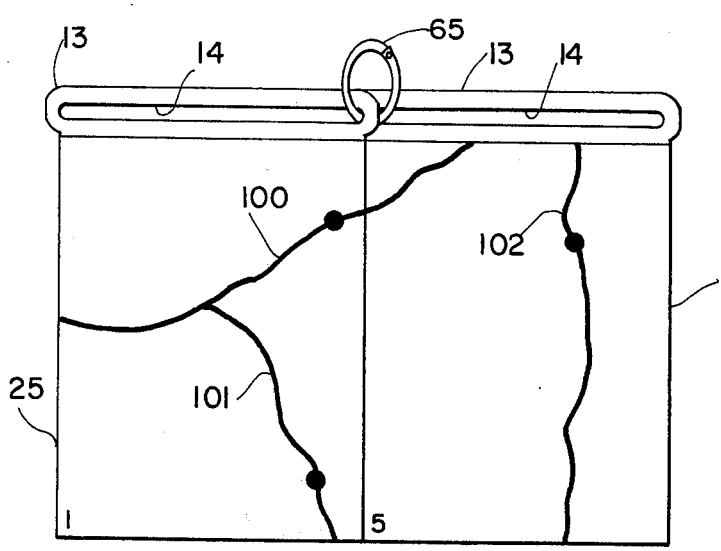
FIG. 6 is a view illustrating the sheets of FIGS. 4 and 5 in adjacent relationship.

FIG. 6 disloses the use of the segmented map of the present invention to enable an observer to consider road 100 in its entirety as it is presented on the map 20. To that end, the cover 10 will be moved from the position shown in FIG. 3, in a counterclockwise manner so as to underlie the sheet 60. This will thereby expose only the upper surface of sheet 25, containing map segment 1, with the other sheets being behind or beneath the sheet 25. The observer then grasps sheet 35 and slides it to the right, to thereby expose the map segment 5, thus arriving at the relative positioning of the segments 1 and 5 as shown in FIG. 6. This will be the same juxtapositional relationship as exists in the map 20. Thus, the transition between the areas disclosed by map segments 1 and 5 is facilitated. The sliding of the sheet 35 is permitted by the slotted flaps 13, and the ring 65, which is seen to be passed through the slots 14 of the sheets 25 and 35, thereby maintaining these two sheets, and all of the other sheets as shown in FIG. 3, in assembled relationship. Due to the fact that the slots 14 extend for a length which is substantially the same as the width of the sheets 25 and 35 (and all other sheets) and since the segments are the full width of the sheets, substantial edge-to-edge placement is obtained, as illustrated in FIG. 6.

As will be understood, any two horizontally adjacent segments may be similarly viewed, including in addition to the segments 1–5, segment pairs 5–9, 9–13, 2–6, 6–10, 10–14, 3–7, 7–11, 11–15, 4–8, 8–12 and 12–16.

Figure 7:
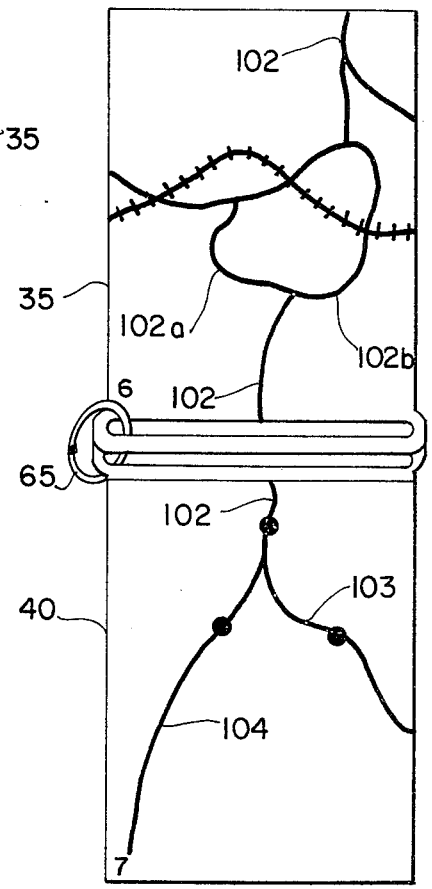
FIG. 7 is a view illustrating additional sheets in adjacent juxtaposed relationship.

The herein described segmented map and holder may also be utilized to view together selected pairs which are in columns, that is, in vertical or north-south relationship as seen on map 20. This is illustrated in FIG. 7, wherein there is shown in the upper part thereof the bottom face of sheet 35. Thus, this is the same sheet 35 as is shown in FIGS. 5 and 6, but the view is of the bottom face thereof. There is also shown the sheet 40, with the upper face thereof exposed and having thereon map segment 7. Referring to FIGS. 5 and 7, it will be seen that if one were interested in the terrain south of the southern edge of map segment 5, turning over the sheet 35 would expose the bottom face, with the area at the upper portion thereof being that area which is just south of the the area at the southernmost or bottom-most portion of the sheet 35 of FIG. 5.

Referring again to FIG. 7, the road 102 may be seen, progressing southerly and dividing into the by-pass roads 102a and 102b, and thence continuing southerly to the bottom or southern-most edge of map segment 6, the continuation being shown at the northern-most or top edge of map segment 7, with the easterly branch 103 and southern extension 104. Thus, the herein disclosed construction permits the viewing of pairs of map segments located in a column or north-south relationship. More particularly, there may be viewed together in like manner the map segments 2–3, 6–7, 10–11 and 14–15. The transition between such segments as 1 and 2 and 15 and 16 may be achieved merely be turning over the particular sheet, such as was hereinabove referred to in connection with sheet 35.

There has been provided a segmented map and holder therefor which is of considerably smaller extent than the total map, the segments being capable of being stacked so as to be handily carried. Because all of the segments are interconnected by a holder, the hereinabove disclosed segmented map and holder prevents loss or misplacement of a segment of the map. The segments may be juxtaposed, so as to position two adjacent segments in the desired relationship, all segments horizontally related or east-west related being able to be placed adjacent the segment having the next adjacent map segment or portion, and the segments which are vertically related being able to be placed adjacent to each other for viewing of two segments, or merely requiring the turning over of a sheet to view the adjacent segment. Further, there is provided with the present construction a guide which permits ready determination of the segments desired to be viewed, due to the correlation of the indicia on the map segments and on the guide.

It will be obvious to those skilled in the art that various changes may be made without departing from the spirit of the invention, and therefore the invention is not limited to what is shown in the drawings and described in the specification but only as indicated in the appended claims.

I claim:

1. A segmented map comprising:

a plurality of map segments derived from a map divided into rows and columns, the map segments together constituting the thus divided map, plural sheets each comprising on the face thereof one said map segment and on the back thereof a second said map segment which is adjacent to the first map segment in said map, a flap extending along the edge of each said sheet said flap being longer than the said edge of the sheet, and having a slot therein said slot of each said flap being longer than the said edge of the sheet, and holding means extending through said slots to hold said sheets in assembled relationship, whereby a back and front of two sheets, and the backs and fronts of two sheets may be placed adjacent to each other for viewing two map segments simultaneously.

2. The segmented map of claim 1, wherein a first said sheet has on the face thereof a segment from a first column of said map and on the back thereof the serially adjacent segment of said first column of said map.

3. The segmented map of claim 2, wherein succeeding sheets have serially adjacent segments of said first column on the front and back thereof.

4. The segmented map of claim 3, wherein succeeding sheets have on the face and back thereof serially adjacent segments of one or more columns of said map serially adjacent said first column.

5. The segmented map of claim 4, each said sheet having a unique indicia thereon, guide means divided into columns and rows of guide mean segments, a said unique indicia in each said guide mean segments correlated to the relative positions of said map segments in said map.

6. The segmented map of claim 2, wherein succeeding sheets have on the face and back thereof serially adjacent segments of one or more columns of said map serially adjacent said first column.

7. The segmented map of claim 6, each said sheet having a unique indicia thereon, guide means divided into columns and rows of guide mean segments, a said unique indicia in each said guide mean segments correlated to the relative positions of said map segments in said map.

8. The segmented map of claim 1, said flap extending along the top of each said sheet.

9. The segmented map of claim 1, said holding means being a ring.

* * * * *